US007698553B2

(12) United States Patent
Biggs et al.

(10) Patent No.: US 7,698,553 B2
(45) Date of Patent: Apr. 13, 2010

(54) METHOD FOR UTILIZING MULTIPLE LEVEL ENCRYPTION

(75) Inventors: Robert A. Biggs, Evanston, IL (US); Donald G. Newberg, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 959 days.

(21) Appl. No.: 10/442,027

(22) Filed: May 20, 2003

(65) Prior Publication Data
US 2004/0236946 A1 Nov. 25, 2004

(51) Int. Cl.
H04L 29/06 (2006.01)
(52) U.S. Cl. ...................... 713/166; 380/200
(58) Field of Classification Search ............. 713/166; 380/200; 455/458; 370/328, 352, 466
See application file for complete search history.

(56) References Cited

U.S. PATENT DOCUMENTS

| 4,881,263 | A | * | 11/1989 | Herbison et al. ............ 713/162 |
| 5,546,464 | A | * | 8/1996 | Raith et al. .................. 380/272 |
| 6,571,212 | B1 | * | 5/2003 | Dent ......................... 704/270.1 |
| 6,631,416 | B2 | * | 10/2003 | Bendinelli et al. .......... 709/227 |
| 6,711,166 | B1 | * | 3/2004 | Amir et al. ................ 370/395.1 |
| 7,028,334 | B2 | * | 4/2006 | Tuomenoksa ................ 726/3 |
| 7,076,064 | B2 | * | 7/2006 | Relander et al. ............ 380/247 |
| 7,369,662 | B2 | * | 5/2008 | Relander et al. ............ 380/261 |
| 2001/0008838 | A1 | | 7/2001 | Toskala et al. |
| 2002/0006137 | A1 | * | 1/2002 | Rabenko et al. ............. 370/466 |
| 2002/0122411 | A1 | * | 9/2002 | Zimmerman et al. ........ 370/349 |
| 2002/0150091 | A1 | * | 10/2002 | Lopponen et al. ........... 370/389 |
| 2003/0039361 | A1 | * | 2/2003 | Hawkes et al. ............. 380/278 |
| 2005/0190920 | A1 | * | 9/2005 | Ahonen ..................... 380/274 |

OTHER PUBLICATIONS

PCT Search Report Dated Dec. 6, 2004.
Canadian Rejection Dated Oct. 7, 2009.
Australian Rejected Dec. 12, 2006.
Mayalsia Notice of Allowance Dated Apr. 18, 2008.
Canadian Rejection Dated Jun. 4, 2008.

* cited by examiner

*Primary Examiner*—Minh Dieu Nguyen
(74) *Attorney, Agent, or Firm*—Terri S. Hughes; Valerie M. Davis

(57) ABSTRACT

In a wireless communication system with an air interface comprised of a plurality of bursts, a communication device (102) receives a burst (200). The burst comprises payload (206, 208), a first indicator (202) and a second indicator (204). Upon receipt of the burst, the communication device determines a value of the first indicator to determine whether end-to-end encryption is applied to at least a portion of the payload, and determines a value of the second indicator to determine whether air interface encryption is applied to at least a portion of the payload.

20 Claims, 3 Drawing Sheets

METHOD FOR UTILIZING MULTIPLE LEVEL ENCRYPTION

FIELD OF THE INVENTION

The present invention relates generally to a method for utilizing multiple level encryption.

BACKGROUND OF THE INVENTION

In wireless communication systems, both air interface encryption and end-to-end encryption play a part in providing confidentiality services. Air interface encryption is applied to information carried on the wireless link between a base radio and a communication device, whereas end-to-end encryption is applied to information exchanged between the source communication device and the final destination communication device of the information where the information may traverse multiple wireless and/or wire-line links.

Encryption requires synchronization of any encryption parameters between the transmitting device and the receiving device in order for information to be successfully decrypted. Typically, the base radio and communication device establish a relationship well before the start of communication, allowing the air interface encryption synchronization parameters to be known a priori by the receiving communication device. However, communication devices may exchange information with a large number of other communication devices, many of which are not known before the start of communication. Because of this, the receiving communication device does not know a priori the encryption synchronization parameters for end-to-end encryption.

Flexible communication systems demand that end-to-end encryption (i.e., the confidentiality service) is applied dynamically, establishing synchronization parameters whenever communication is initiated. These synchronization parameters are typically signaled in their entirety at the beginning of a transmission. These synchronization parameters are also signaled in part throughout the duration of the transmission at a very slow rate (due to limited bandwidth) to accommodate communication devices that enter the communication session after the initial signaling, a condition that is called "late-entry". Because the encryption synchronization information is re-transmitted throughout the transmission at a rate that is typically much slower than the information it protects, this late entry condition can cause ambiguity in the receiving communication device. Thus, if the receiving communication device misses the initial transmission of encryption synchronization information, the receiving communication device is forced to either assume an encryption state, which will likely result in processing errors, or acquire the encryption synchronization information when re-transmitted throughout the transmission at the very slow rate which will result in additional delays. For example, if a receiving communication device mistakenly believes that an end-to-end encrypted call is sent unencrypted or visa-versa, objectionable noises may be generated.

Thus, there exists a need for a method for indicating and processing multiple levels of encryption.

BRIEF DESCRIPTION OF THE FIGURES

A preferred embodiment of the invention is now described, by way of example only, with reference to the accompanying figures in which.

DETAILED DESCRIPTION OF THE PREFERRED EMBODIMENT

Figure 1:
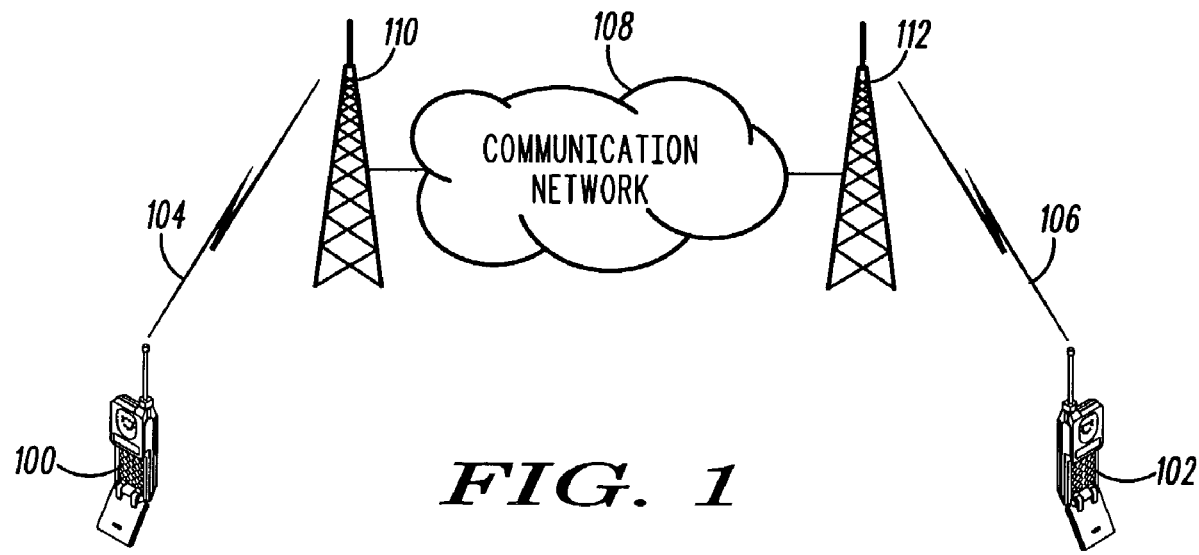
FIG. 1 (prior art) illustrates a system topology of a wireless communication system.

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

The present invention provides a first indicator to indicate whether end-to-end encryption is applied to at least a portion of the payload and a second indicator to indicate whether air interface encryption is applied to at least a portion of the payload in each over-the air burst (i.e., over-the-air fragment); thus, the first indicator and the second indicator are present at the same layer of the protocol stack (e.g., the link layer). The receiving device uses the indicators to efficiently determine any decryption mechanism, if any, required to recover/process the received information/payload. It should be noted that the present invention uses the term "fragment" and/or "burst" to describe the smallest standalone entity of the air interface. In a time division multiple access ("TDMA") system, this may also be called a slot.

Turning now to the figures, as illustrated in FIG. 1, a first communication device 100 is communicating with a second communication device 102 via wireless links 104, 106 and a communication network 108. For ease of explanation, the first communication device 100 is the transmitting communication device, and the second communication device 102 is the receiving communication device, however, each communication device 100, 102 is capable of both transmitting and receiving.

Air interface encryption, if utilized, may be applied to information exchanged between the first communication device 100 and a first base radio 110, information exchanged between the second communication device 102 and a second base radio 112, or both. End-to-end encryption, if utilized, may be applied to information exchanged between the first communication device 100 and the second communication device 102. Typically, the information to which end-to-end encryption is applied is to real-time media, such as voice, video and/or the like, but is not limited to such. Both air interface encryption and end-to-end encryption are optional and thus four combinations of encryption are possible. These are addressed in FIGS. 2-6.

FIGS. 2-5 illustrates examples of the structure of a burst 200 comprising the first indicator 202, the second indicator 204 and two fields of payload 206, 208 in accordance with the preferred embodiment of the present invention; FIG. 6 illustrates a flowchart of the operation of the receiving communication device 102 to determine the earliest point in time at which the receiving communication device 102 may process the received payload 206, 208. Some of the payload fields are capable of being protected with end-to-end encryption, while all of the fields are capable of being protected with air interface encryption. It should be noted that while FIGS. 2-5 illustrate two fields of payload 206, 208 in the burst 200, the burst 200 may containing any number of fields, including one, and still remain within the spirit and scope of the present invention.

Figure 2:
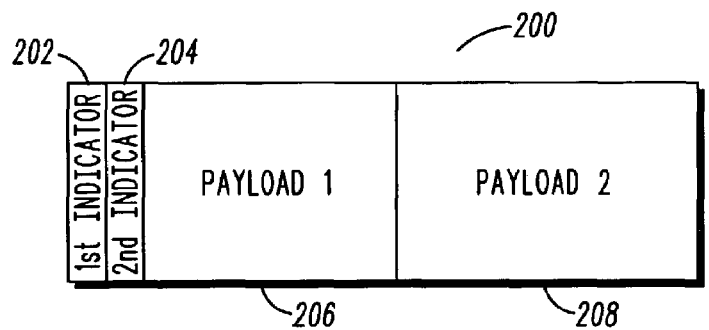
FIG. 2 illustrates an example structure of a burst in which no encryption is applied to the information in accordance with the preferred embodiment of the present invention.

The first of the four possible combinations of encryption is illustrated in FIG. 2 and in steps 600-608 of FIG. 6. In the first combination, when the receiving communication device 102 receives a burst 200, the values of the indicators 202, 204 indicate that neither end-to-end encryption nor air interface encryption is applied to the payload 206, 208. Since no encryption synchronization parameters are needed to process the payload 206, 208, providing the first indicator 202 and the second indicator 204 in each burst 200 allows the receiving communication device 102 to detect this state as the current burst 200 is being received and begin processing the payload 206, 208 from the current and subsequently received bursts at the earliest point in time (i.e., immediately).

Figure 3:
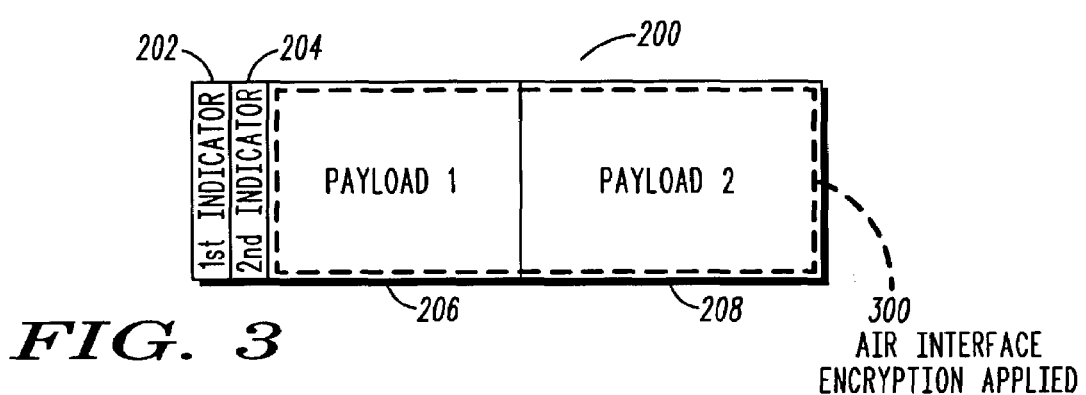
FIG. 3 illustrates an example structure of a burst in which only air interface encryption is applied to the information in accordance with the preferred embodiment of the present invention.

The second of the four possible combinations of encryption is illustrated in FIG. 3 and in steps 600, 602, and 610-616 of FIG. 6. In the second combination, when the receiving communication device 102 receives a burst 200, the values of the indicators 202, 204 indicate that only air interface encryption 300 is applied to at least a portion of the payload 206, 208. The present invention assumes that the receiving communication device 102 knows a priori the encryption synchronization parameters for the air interface encryption 300. Since no further encryption synchronization is needed, providing the first indicator 202 and the second indicator 204 in each burst 200 allows the receiving communication device 102 to detect this state as the burst 200 is being received, and begin decrypting the air interface encryption 300 and processing the payload 206, 208 from the current burst and subsequently received bursts at the earliest point in time (i.e., immediately).

Figure 4:
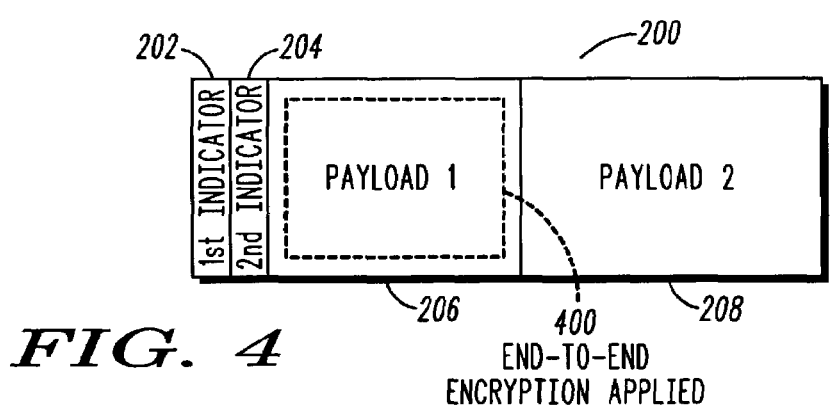
FIG. 4 illustrates an example structure of a burst in which only end-to-end encryption is applied to the information in accordance with the preferred embodiment of the present invention.

The third of the four possible combinations of encryption is illustrated in FIG. 4 and in steps 600-604 and 618-624 of FIG. 6. In the third combination, when the receiving communication device 102 receives a burst 200, the values of the indicators 202, 204 indicate that only end-to-end encryption 400 is applied to at least a portion of the payload 206. If the receiving communication device 102 has not yet acquired the encryption synchronization parameters for the end-to-end encryption 400 (e.g., due to late entry), the receiving communication device 102 cannot yet process the portion of the payload 206 that is end-to-end encrypted. Thus, the first indicator 202 indicates to the receiving communication device 102 that end-to-end encryption 400 is applied to at least a portion of the payload 206, thus triggering the receiving communication device 102 to start acquiring the encryption synchronization parameters immediately, starting with the current burst 200. It should be noted that acquiring the encryption synchronization parameters for end-to-end encryption 400 might span several additional bursts due to the slow speed nature of the signaling. In other words, the receiving communication device 102 may need to receive a plurality of bursts 200 before it is able to acquire the encryption synchronization parameters for the end-to-end encryption 400; thus, upon receiving the plurality of bursts 200, the receiving communication device 102 extracts information from each burst 200 and optionally discards the payload associated therewith until the encryption synchronization parameters for the end-to-end encryption 400 are acquired. Once the encryption synchronization parameters for the end-to-end encryption 400 are acquired, the receiving communication device 102 can then decrypt the end-to-end encryption 400 from the payload 206 and process the payload 206 from subsequently received bursts 200.

Figure 5:
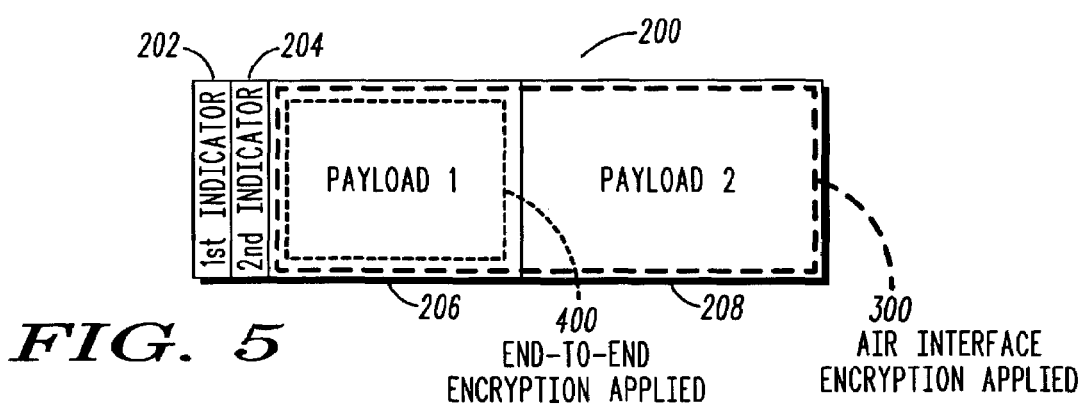
FIG. 5 illustrates an example structure of a burst in which both end-to-end encryption and air interface encryption is applied to the information in accordance with the preferred embodiment of the present invention.
Figure 6:
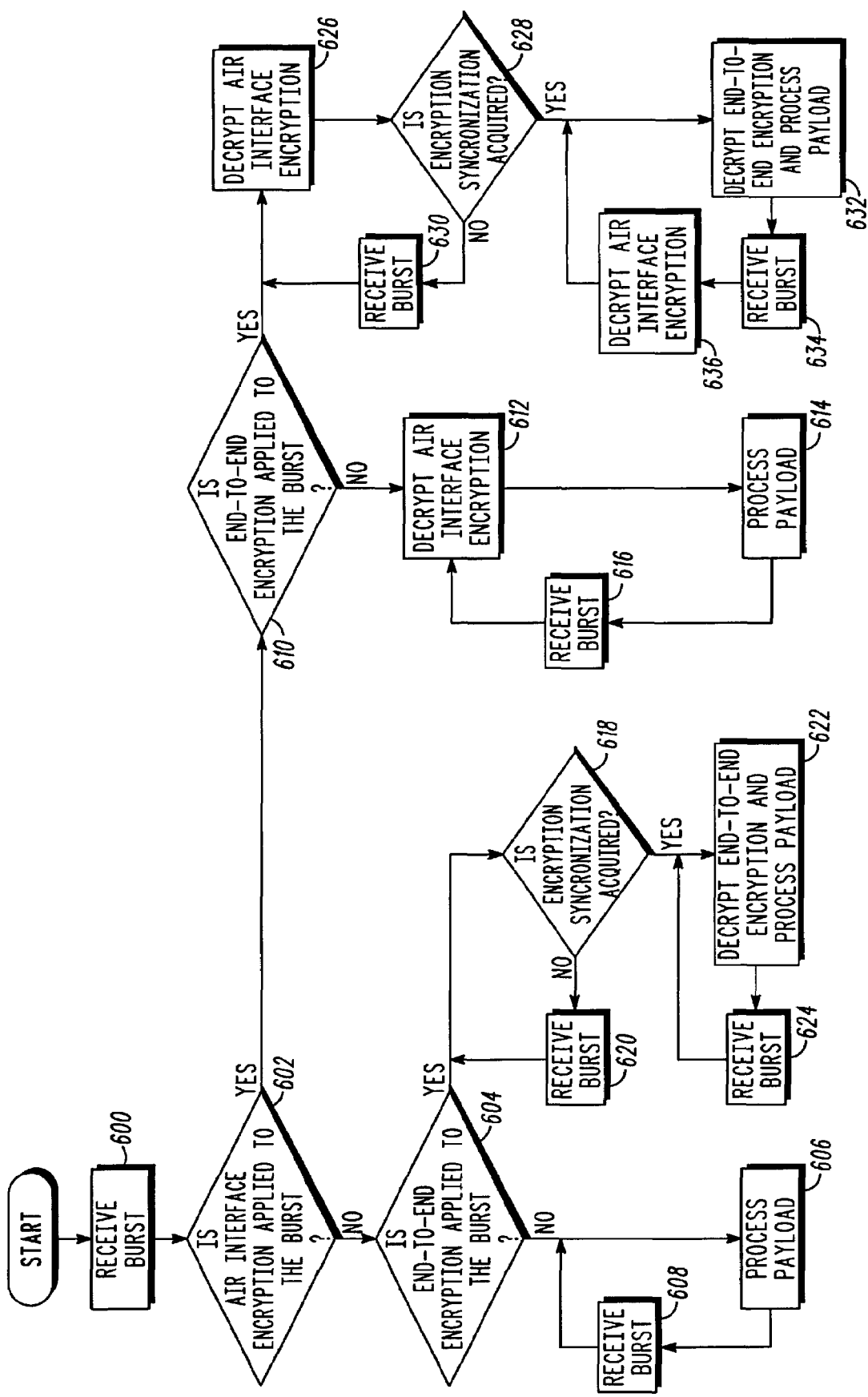
FIG. 6 illustrates a flowchart of the operation of the receiving device to determine the earliest possible time at which the receiving device may process the received information

The fourth of the four possible combinations of encryption is illustrated in FIG. 5 and in steps 600, 602, 610, and 626-636 of FIG. 6. In the fourth combination, when the receiving communication device 102 receives a burst 200, the values of the indicators 202, 204 indicate that both air interface encryption 300 and end-to-end encryption 400 are applied to at least a portion of the payload 206, 208. As noted above, the present invention assumes that the receiving communication device 102 knows a priori the encryption synchronization parameters for the air interface encryption 300, and thus, is able to decrypt the air interface encryption 300 at the earliest point in time (i.e., immediately). However, if the receiving communication device 102 has not yet acquired the encryption synchronization parameters for the end-to-end encryption 400 (e.g., due to late entry), the receiving communication device 102 cannot yet decrypt the end-to-end encryption 400 and process at least a portion of the payload 206; thus, the first indicator 202 indicates to the receiving communication device 102 that end-to-end encryption 400 is applied to at least a portion of the payload, thus triggering the receiving communication device 102 to start acquiring the encryption synchronization parameters for the end-to-end encryption at the earliest point in time (i.e., immediately), starting with the current burst 200. Once the encryption synchronization parameters for the end-to-end encryption 400 are acquired as described above in the third combination, the receiving communication device 102 can continue decrypting the air interface encryption 300, start decrypting the end-to-end encryption 400 and processing the payload 206 from subsequently received bursts 200.

Thus, the present invention uses the indicators 202, 204 to indicate the status of each encryption within each burst 200. The indicators 202, 204 allows the receiving communication device 102 to detect the status of encryption (i.e., the state of the payload 206, 208) and process the payload 206, 208 correctly (i.e., the indicators 202, 204 prevent mismatches in the possible combinations of encryption that result in noise in an audio stream) at the earliest point in time; for example, the receiving communication device 102 can play audio as soon as possible. The present invention is preferably implemented in software, but could also be implemented in firmware, hardware or any combination of software, hardware and/or firmware. It should be noted that the present invention can be embodied in a storage medium having stored thereon a set of instructions which, when loaded into a hardware device, causes the hardware device to perform the following functions of the present invention.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. In a wireless communication system with an air interface comprised of a plurality of bursts, a method comprising:
   receiving a burst, wherein the burst comprises payload comprising at least two payload fields, a first indicator and a second indicator;
   determining a value of the first indicator to determine whether end-to-end encryption is applied to at least one payload field; and
   determining a value of the second indicator to determine whether air interface encryption is applied to the payload,
   wherein the first indicator and the second indicator are present at a same single layer of a protocol stack.

2. The method of claim 1 wherein the value of the first indicator indicates that end-to-end encryption is not applied to at least the one payload field, and wherein the second indicator indicates that air interface encryption is not applied to the payload, and the method further comprising immediately processing the payload.

3. The method of claim 1 wherein the value of the first indicator indicates that end-to-end encryption is not applied to at least the one payload field, and wherein the second indicator indicates that air interface encryption is applied to the payload, and the method further comprising decrypting the air interface encryption with encryption synchronization parameters known a priori, and processing the payload immediately.

4. The method of claim 1 wherein the value of the first indicator indicates that end-to-end encryption is applied to at least the one payload field, and wherein the second indicator indicates that air interface encryption is not applied to the payload, and the method further comprising:
   acquiring encryption synchronization for end-to-end encryption; and
   decrypting the end-to-end encryption using the acquired encryption synchronization for end-to-end encryption.

5. The method of claim 4 wherein acquiring comprises extracting information from at least one additional burst, and discarding payload associated with the burst and the at least one additional burst.

6. The method of claim 4 wherein decrypting the end-to-end encryption is applied to subsequently received bursts.

7. The method of claim 1 wherein the value of the first indicator indicates that end-to-end encryption is applied to at least the one payload field, and wherein the second indicator indicates that air interface encryption is applied to the payload, and the method further comprising:
   decrypting the air interface encryption with encryption synchronization parameters for air interface encryption known a priori;
   acquiring encryption synchronization parameters for end-to-end encryption; and
   decrypting the end-to-end encryption using the acquired encryption synchronization parameters for end-to-end encryption.

8. The method of claim 7 wherein acquiring comprises extracting information from at least one additional burst, and discarding payload associated with the burst and the at least one additional burst.

9. The method of claim 7 wherein decrypting the end-to-end encryption is applied to subsequently received bursts.

10. The method of claim 1 wherein at least the one payload field in which end-to-end encryption is applied is real-time media.

11. The method of claim 10 wherein real-time media is selected from a group consisting of voice and video.

12. The method of claim 1 further comprising receiving at least a second burst, wherein each burst comprises payload, the first indicator and the second indicator.

13. A storage medium having stored thereon a set of instructions which, when loaded into a hardware device, causes the hardware device to:
   receive a burst, wherein the burst comprises payload comprising at least two payload fields, a first indicator and a second indicator;
   determine a value of the first indicator to determine whether end-to-end encryption is applied to at least one payload field; and
   determine a value of the second indicator to determine whether air interface encryption is applied to the payload,
   wherein the first indicator and the second indicator are present at a same single layer of a protocol stack.

14. The storage medium of claim 13 wherein the value of the first indicator indicates that end-to-end encryption is not applied to at least one payload field, and wherein the second indicator indicates that air interface encryption is not applied to the payload, and the hardware device further immediately processing the payload.

15. The storage medium of claim 13 wherein the value of the first indicator indicates that end-to-end encryption is not applied to at least one payload field, and wherein the second indicator indicates that air interface encryption is applied to the payload, and the hardware device further decrypting the air interface encryption with encryption synchronization parameters known a priori, and processing the payload immediately.

16. The storage medium of claim 13 wherein the value of the first indicator indicates that end-to-end encryption is applied to at least one payload field, and wherein the second indicator indicates that air interface encryption is not applied to the payload, and the hardware device further:
   acquiring encryption synchronization for end-to-end encryption; and
   decrypting the end-to-end encryption using the acquired encryption synchronization for end-to-end encryption.

17. The storage medium of claim 13 wherein the value of the first indicator indicates that end-to-end encryption is applied to at least one payload field, and wherein the second indicator indicates that air interface encryption is applied to the payload, and the hardware device further:
   decrypting the air interface encryption with encryption synchronization parameters for air interface encryption known a priori;
   acquiring encryption synchronization parameters for end-to-end encryption; and
   decrypting the end-to-end encryption using the acquired encryption synchronization parameters for end-to-end encryption.

18. The storage medium of claim 13 further causing the hardware device to receive at least a second burst, wherein each burst comprises payload comprising the at least two payload fields, the first indicator and the second indicator.

19. The storage medium of claim 13 wherein the at least one payload field in which end-to-end encryption is applied is real-time media.

20. The storage medium of claim 19 wherein real-time media is selected from a group consisting of voice and video.

* * * * *